(12) United States Patent
Wermelinger et al.

(10) Patent No.: US 6,510,598 B2
(45) Date of Patent: Jan. 28, 2003

(54) CLAMPING ELEMENT

(75) Inventors: Jorg Wermelinger, Schaffhausen (CH); Marcus Bayer, Schaffhausen (CH)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 0 days.

(21) Appl. No.: 09/885,664

(22) Filed: Jun. 20, 2001

(65) Prior Publication Data

US 2002/0004976 A1 Jan. 17, 2002

(30) Foreign Application Priority Data

Jul. 17, 2000 (DE) .......................... 100 35 093

(51) Int. Cl.$^7$ .............................................. B25B 27/14
(52) U.S. Cl. ................. 29/281.1; 269/254 CS
(58) Field of Search ................. 29/281.1, 559; 269/900, 254 CS, 6, 3, 257, 909

(56) References Cited

U.S. PATENT DOCUMENTS

| 3,805,646 A | * | 4/1974 | Knight | 269/130 |
| 4,874,156 A | * | 10/1989 | Goldzweig | 269/254 CS |
| 4,877,228 A | * | 10/1989 | Ripert | 269/254 CS |
| 5,241,157 A | | 8/1993 | Wermelinger et al. | |
| 5,312,094 A | * | 5/1994 | Zera | 269/3 |

FOREIGN PATENT DOCUMENTS

DE 2020625 12/1971

\* cited by examiner

*Primary Examiner*—Lee Wilson
(74) *Attorney, Agent, or Firm*—Bachman & LaPointe, P.C.

(57) ABSTRACT

A clamping device for fixing plastic molded parts during welding is proposed, comprising a flange-like fastening part for fastening on a plastics welding device, the fastening part having at least one first annular recess for receiving a clamping element and the fastening part having at least one second recess for receiving spring elements acting radially on the clamping element, the clamping element having at least one projection on an inner surface which is arranged opposite the outer surface of the plastic molded part. The clamping element allows good fixing of the plastic molded parts in a very confined space.

24 Claims, 2 Drawing Sheets

CLAMPING ELEMENT

BACKGROUND OF THE INVENTION

The invention relates to a clamping device for fixing plastic molded parts during welding, comprising a flange-like fastening part for fastening on a plastics welding device, the fastening part having at least one first annular recess for receiving a clamping element and the fastening part having at least one second recess for receiving spring elements acting radially on the clamping element.

In pipeline construction, plastic molded parts, such as pipe bends and pipe branches for example, are being increasingly used and are welded to one another on the construction site. The plastic molded pipe parts are fixed in axial alignment with one another in a special welding device and worked at right angles and in a planar manner. The pipe ends are heated up and pressed axially together. During the welding operation, the plastic molded pipe parts are firmly held on the welding device by clamping systems.

U.S. Pat. No. 5,241,157 discloses a device for welding the end faces of plastic parts, which discloses, inter alia, two generically determinative clamping devices. One clamping device is fixed and the second clamping device is axially displaceable in their arrangement in the welding device. The clamping devices take the form of semicircular components which have a relatively large width in the axial direction in comparison with the pipe diameter. The large width is necessary to distribute the clamping force uniformly over the circumference of the molded pipe parts to be welded to one another and thus hold the pipes well in the desired position during the welding operation. It is not described how the clamping force is produced. To make good fixing possible, even in confined spaces and with fittings and molded pipe parts becoming increasingly smaller, novel fixing devices are desired.

It is an object of the invention to provide a clamping element for fixing plastic molded parts during welding, achieving fixing which is as secure as possible and saves as much space as possible.

SUMMARY OF THE INVENTION

The foregoing object is achieved by a clamping device for fixing plastic molded parts during welding comprising a flange-like fastening part for fastening on a plastics welding device, the fastening part having at least one first annular recess for receiving a clamping element and the fastening part having at least one second recess for receiving spring elements acting radially on the clamping element, and the clamping element having at least one projection on an inner surface which is arranged opposite the outer surface of the plastic molded part.

It is advantageous that the plastic molded pipe part is firmly held in the welding device securely and as far as possible without damage during welding. This is achieved by the inner surface of the annular clamping element being arranged in an annular and segmental manner, in such a way that the projection encloses the plastic molded part with a uniformly distributed clamping force during the welding operation. This is also achieved by the projection having side surfaces and a clamping surface, the clamping surface being arranged in a concentric and segmentally extending manner with respect to the annular inner surface.

It is also advantageous that the plastic molded pipe part is prevented from creeping out of the welding device during welding. This is achieved by the projections being arranged such that they extend parallel to one another. This is also achieved by the projections being arranged such that they are spaced one behind the other in the axial direction of the plastic parts to be welded.

It is also advantageous that the clamping operation leaves the least possible visible traces behind on the plastic molded pipe part. This is achieved by the projections having a height of 0.1 to 0.3 mm above the inner surface of the clamping element.

It is also advantageous that a highest possible clamping force acts on the plastic molded pipe parts during welding. This is achieved by the clamping surface being arranged at right angles with respect to the side surfaces and adjoining the side surfaces of the projection with sharp edges. This is also achieved by the clamping surface of the projection having a width B of less than 20% of the width of the inner surface of the clamping element.

It is also advantageous that relatively short molded pipe parts can also be reliably welded to one another. This is achieved by the clamping elements being arranged at a distance of less than 25 mm from the welding point of the plastic molded parts to be welded.

It is also advantageous that the plastic molded pipe parts can be introduced easily into the welding device and that the welding device can be put together and operated easily. This is achieved by two fastening parts and two clamping elements being respectively arranged in the plastics welding device for each of the plastic parts to be welded to one another on opposite sides of the welding point as semicircular workpieces matching one another.

BRIEF DESCRIPTION OF THE DRAWINGS

An exemplary embodiment of the invention is described with reference to the figures, in which.

DETAILED DESCRIPTION

Figure 1:
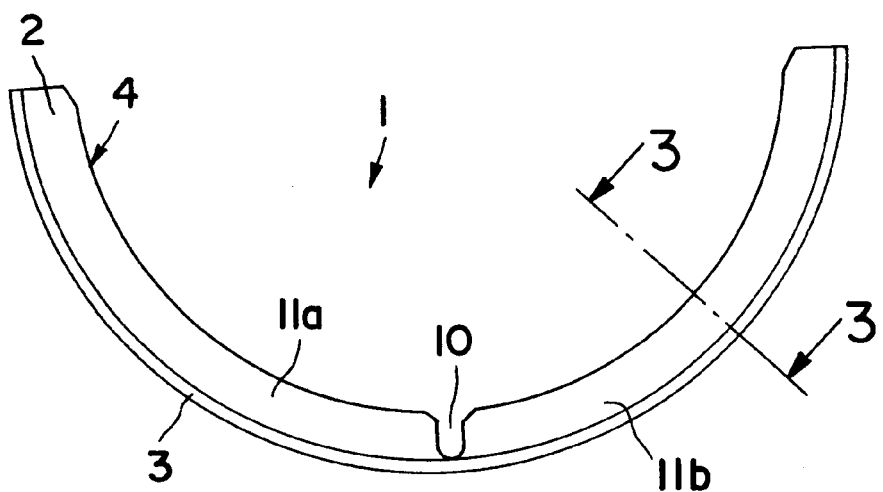
FIG. 1 shows a view of a clamping element according to the invention.

Represented in FIG. 1 is a clamping element 1 for fixing plastic molded pipe parts in a plastics welding device during welding. The clamping element 1 is an annular part. Two identical parts respectively enclose a plastic molded pipe part to be welded, which is not described in any more detail here. Examples of plastic molded pipe parts which can be welded to one another are pipeline ends, pipeline connecting regions of fittings, valves, pipeline branches or bends. On each side of the welding point, at least two clamping elements 1 are respectively required in order to fix the plastic molded pipe parts. The clamping elements 1 are designed in such a way that they enclose the plastic molded pipe part in a semicircular manner. In the case of very large pipeline diameters, the clamping elements 1 may also be designed in the form of segments of a circle.

Figure 3:
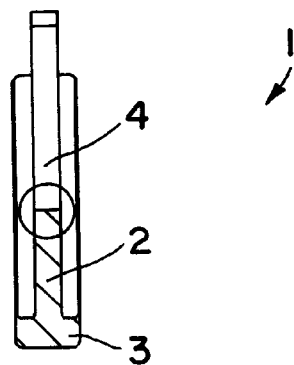
FIG. 3 shows a somewhat enlarged section through the clamping element along line 3—3 of FIG. 1.

The clamping element 1 is essentially an annular disc 2 with an essentially T-shaped profile (See FIG. 3). On the outer side, the disc 2 is bounded by a peripheral edge 3, which is much thicker than the remainder of the annular disc 2. On the inner side of the annular disc 2, the clamping element 1 is bounded by an inner surface 4. A line 3—3 through the clamping element 1 denotes a sectional area, which is represented and described in FIGS. 3, 4 and 5.

Figure 2:
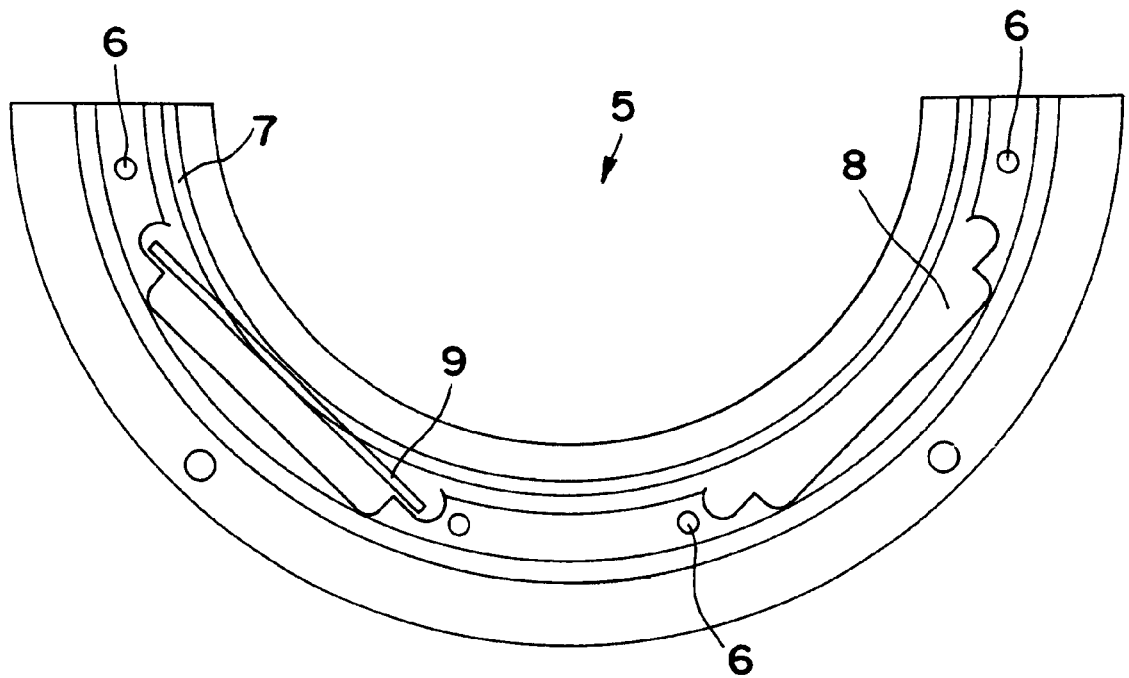
FIG. 2 shows a view of a flange-like fastening part for receiving the clamping element of FIG. 1.

Represented in FIG. 2 is a flange-like fastening part 5. The flange-like fastening part 5 from FIG. 2 has four identical bores 6, through which screws or other fastening means can be inserted. The fastening part 5 can be fastened by the screws onto the plastics welding device, or more precisely onto the clamping device in the welding device. Formed in the fastening part 5 is an annular recess 7, in which the edge 3 of the clamping element 1 from FIG. 1 can be received. When the clamping element 1 has been received in the fastening part 5, the fastening part 5 covers virtually the entire clamping element 1, with the exception of the inner region of the disc 2 with the inner surface 4. FIG. 1 and FIG. 2 can also be interpreted together as an exploded representation of the clamping element 1 and fastening part 5.

The flange-like fastening part 5 also has two further recesses 8. Represented in one of the further recesses 8 is a spring element 9, here a plate 9 of spring steel. The spring elements 9 overlap a certain region of the first recess 7 for receiving the clamping element 1. This indicates that the spring elements 9 can act radially on the clamping element 1 and consequently the clamping element exerts a clamping force radially inwards in the direction of the outer surface of the plastic molded pipe part. The spring elements 9 may also be arranged as leaf spring assemblies or as helically designed springs in suitable recesses 8 in the fastening part 5. In FIG. 1, the clamping element 1 is divided by a notch 10 into two segments 11a, 11b. For each segment 11a, 11b, a spring element 9 is provided in the fastening part 5. If a plurality of spring elements 9 are provided, the clamping element 1 may also be divided into a plurality of segments 11. This achieves the effect that the clamping force can be applied in such a manner that it is distributed as uniformly as possible over the circumference of the plastic pipe.

Figure 4:
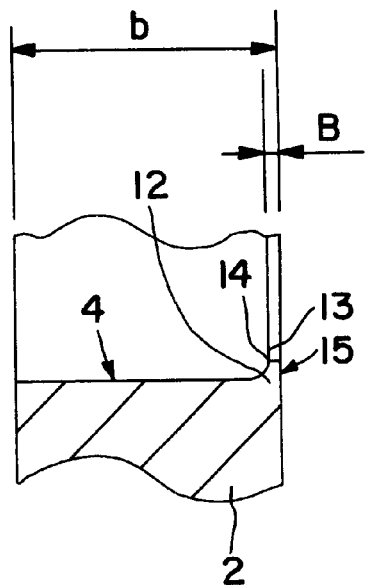
FIG. 4 shows a further enlargement from a circled partial region of the clamping element of FIG. 3
Figure 5:
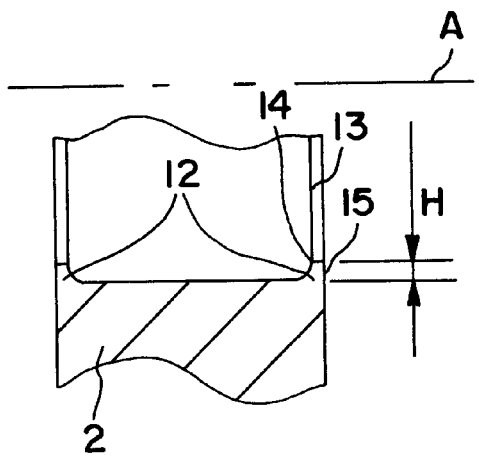
FIG. 5 shows a second exemplary embodiment of the clamping element of FIG. 4.

In FIGS. 3, 4 and 5, sections along the line 3—3 of FIG. 1 are represented in an enlarged form. FIGS. 4 and 5 are larger enlargements of a partial circled region of FIG. 3. FIG. 3 illustrates, in section, that the clamping element 1 has a T-shaped cross section. The shorter bar of the T represents the edge 3 and the longer bar of the T is formed by the annular disc 2, divided into the segments 11a, 11b.

Represented in FIGS. 4 and 5 is the part of the clamping element which is arranged opposite the outer surface of the plastic molded part during welding. The inner surface 4 of the clamping element 1 has in FIG. 4 one projection 12 and in FIG. 5 two projections 12. Configurations with a plurality of projections 12 are also conceivable. The projections 12 are, however, always arranged such that they extend parallel to one another and are arranged at a certain distance one behind the other in the axial direction A (see FIG. 5) of the plastic molded pipe parts to be welded. By this axial arrangement of a plurality of projections 12 one behind the other, the plastic pipe is fixed and held at the desired position in the welding device. The projections 12 have a clamping surface 13, an inner side surface 14 and an outer side surface 15. The projections 12 have a height H of 0.1 to 0.3 mm above the inner surface 4 of the clamping element 1.

It is also illustrated in FIG. 4 how the projection 12 has a width B which is less than 20% of the width b of the disc 2 of the clamping element 1. It is determined by this width ratio b/B how large the surface pressure on the outer surface of the plastic molded pipe part is. The clamping surface 13 extends at right angles with respect to the side surfaces 14, 15 and the transition from the side surfaces 14, 15 to the clamping surface 13 is configured in a sharp-edged manner, that is to say without rounding or beveling. The clamping surface 13 extends parallel to the inner surface 4 or, in the case of a tubular plastic molded part, coaxially with the axis of the molded part and coaxially with the inner surface 4 of the clamping element 1. It is ensured by this arrangement that the clamping element 1 is pressed into the outer surface of the plastic part at most by the height H of the projection 12, which is preferably 0.1 to 0.3 mm. This achieves the effect that the plastic parts to be welded to one another are not deformed under the necessary high contact pressure in a way that they should not be. For the strength of the plastic part, an impression of a few tenths of a mm is admissible. The impression which remains in the outer surface of the plastic part after removal of the clamping element 1 and after the welding operation will be less deep than the height H of the projection 12.

The T-shaped profile of the clamping element 1, together with the width ratio b/B, makes it possible for a sufficiently high surface pressure to be applied. Because the projections 12 of the clamping elements 1 are relatively narrow, the plastic molded pipe parts can be fixed very close to the pipe end and very close to the welding point. The clamping elements 1 may be arranged for example at a distance of less than 25 mm on both sides of the welding point. This makes it possible for even very short pieces of pipe to be fixed and welded to one another. Consequently, pipelines with branches or fittings can be installed and welded even in very confined spaces. The clamping element 1 can be used both for relatively soft plastics and for relatively brittle plastics.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A clamping device for use with a plastic welding machine for fixing plastic molded parts during welding, comprising a fastening part for fastening on a plastics welding machine, the fastening part has an at least one first annular recess for receiving a clamping element and an at least one second recess for receiving spring means which acts radially on the clamping element, wherein the clamping element has at least one projection on an inner surface which bears on an outer surface of a plastic molded part to be welded.

2. A clamping device according to claim 1, wherein the clamping element is annular and the inner surface of the annular clamping element extends coaxially with the plastic molded part and is arranged in a segmental manner, in such a way that the projection encloses the plastic molded part with a uniformly distributed clamping force during the welding operation.

3. A clamping device according to claim 1, wherein the projection has side surfaces and a clamping surface, the clamping surface being arranged in such a manner that it extends concentrically with respect to the axially extending inner surface.

4. A clamping device according to claim 3, wherein the clamping surface is arranged at right angles with respect to the side surfaces and form sharp edges.

5. A clamping device according to claim 1, including a plurality of projections arranged such that they extend parallel to one another.

6. A clamping device according to claim 5, wherein the projections are arranged such that they are spaced one behind the other in an axial direction of the plastic parts to be welded.

7. A clamping device according to claim 1, including a plurality of projections wherein the projections have a height H of 0.1 to 0.3 mm above the inner surface of the clamping element.

8. A clamping device according to claim 1, wherein the clamping surface of the projection has a width B of less than 20% of a width b of the inner surface of the clamping element.

9. A clamping device comprising a fastening part, the fastening part has at least one first annular recess for receiving a clamping element and at least one second recess for receiving spring means which acts radially on the clamping element, wherein the clamping element has at least one projection on an inner surface and wherein the clamping element is annular and the inner surface of the annular clamping element is arranged in a segmental manner.

10. A clamping device according to claim 9, wherein the projection has side surfaces and a clamping surface, the clamping surface being arranged in such a manner that it extends concentrically with respect to the axially extending inner surface.

11. A clamping device according to claim 10, wherein the clamping surface is arranged at right angles with respect to the side surfaces and form sharp edges.

12. A clamping device according to claim 9, including a plurality of projections arranged such that they extend parallel to one another.

13. A clamping device according to claim 9, wherein the projections are arranged such that they are spaced one behind the other in an axial direction.

14. A clamping device according to claim 9, including a plurality of projections wherein the projections have a height H of 0.1 to 0.3 mm above the inner surface of the clamping element.

15. A clamping device according to claim 9, wherein the clamping surface of the projection has a width B of less than 20% of a width b of the inner surface of the clamping element.

16. A clamping device according to claim 9, including two fastening parts and two clamping elements are respectively arranged as semicircular workpieces matching one another.

17. A clamping device comprising at least one projection on an inner surface which is arranged opposite the outer surface of the plastic molded part, wherein the clamping element is annular and the inner surface of the annular clamping element is arranged in a segmental manner.

18. A clamping device according to claim 17, wherein the projection has side surfaces and a clamping surface, the clamping surface being arranged in such a manner that it extends concentrically with respect to the axially extending inner surface.

19. A clamping device according to claim 18, wherein the clamping surface is arranged at right angles with respect to the side surfaces and form sharp edges.

20. A clamping device according to claim 17, including a plurality of projections arranged such that they extend parallel to one another.

21. A clamping device according to claim 9, wherein the projections are arranged such that they are spaced one behind the other in an axial direction.

22. A clamping device according to claim 17, including a plurality of projections wherein the projections have a height H of 0.1 to 0.3 mm above the inner surface of the clamping element.

23. A clamping device according to claim 17, wherein the clamping surface of the projection has a width B of less than 20% of a width b of the inner surface of the clamping element.

24. A clamping device according to claim 17, including two clamping elements arranged as semicircular elements matching one another.

* * * * *